United States Patent [19]

Croteau

[11] Patent Number: 4,560,066
[45] Date of Patent: Dec. 24, 1985

[54] ACCESSORY TRAY FOR PORTABLE COMPUTER

[76] Inventor: Michael Croteau, 69 Left Derryfield Rd., Derry, N.H. 03838

[21] Appl. No.: 601,855

[22] Filed: Apr. 19, 1984

[51] Int. Cl.⁴ .............................................. B65D 21/00
[52] U.S. Cl. .................................... 206/501; 206/514; 206/821; 206/557
[58] Field of Search ................... 220/18; 206/557, 501, 206/514, 821

[56] References Cited

U.S. PATENT DOCUMENTS

| | | | |
|---|---|---|---|
| 1,941,941 | 1/1934 | Irwin | 206/501 |
| 3,394,833 | 7/1968 | Forni et al. | 220/18 |
| 3,428,381 | 2/1969 | Schnur et al. | 206/514 |
| 3,432,061 | 3/1969 | Anderson | 220/18 |
| 3,526,314 | 9/1970 | Trammell, Jr. | 220/18 |
| 3,907,104 | 9/1975 | Taub | 220/18 |
| 4,160,570 | 7/1979 | Bridges | 220/18 |
| 4,279,354 | 7/1981 | Conti | 206/501 |

*Primary Examiner*—Joseph Man-Fu Moy

[57] ABSTRACT

An accessory tray particularly adapted for holding in an organized manner computer discs, owner's manual and other accessories frequently used with a portable computer. The accessory tray is attachable to the portable computer in such a manner that the accessory tray becomes a part of the carrying case of the portable computer.

4 Claims, 3 Drawing Figures

ACCESSORY TRAY FOR PORTABLE COMPUTER

BACKGROUND OF THE INVENTION

This invention relates to an accessory tray attached to a portable computer. A problem frequently experienced by users of portable computers is that the carrying case of the computer provides little room for storage for extra computer discs; and provides no room for storage of items such as an owner's manual or other materials which are frequently used in conjunction with the portable computer. Thus, the user may find it necessary, in addition to carrying the portable computer to a particular location, to also carry a briefcase or other carrying means to hold extra computer discs, the owner's manual and other items.

Therefore, it is an object of this invention to provide an accessory tray for carrying a substantial quantity of computer discs, an owner's manual, and/or other accessories frequently used with the portable computer.

It is another object of this invention to provide an accessory tray which is attachable to the portable computer in such a manner that the accessory tray becomes a part of the carrying case of the portable computer.

It is a further object of this invention to provide an accessory tray including a holder which can safely carry a substantial supply of computer discs without being damaged by other accessories being carried in the tray.

BRIEF SUMMARY OF THE INVENTION

The foregoing and other objects are achieved by providing an accessory tray which can accommodate computer discs, an owner's manual and other items and is attachable to the portable computer. The accessory tray becomes a part of the computer carrying case and thus eliminates the need for carrying these extra items separately.

BRIEF DESCRIPTION OF THE DRAWINGS

The invention itself is set forth in the claims appended hereto and forming a part of this specification, while an understanding of embodiments thereof made be had by reference to the detailed description taken in conjunction with the drawings in which:

DESCRIPTION OF THE PREFERRED EMBODIMENT

Figure 1:
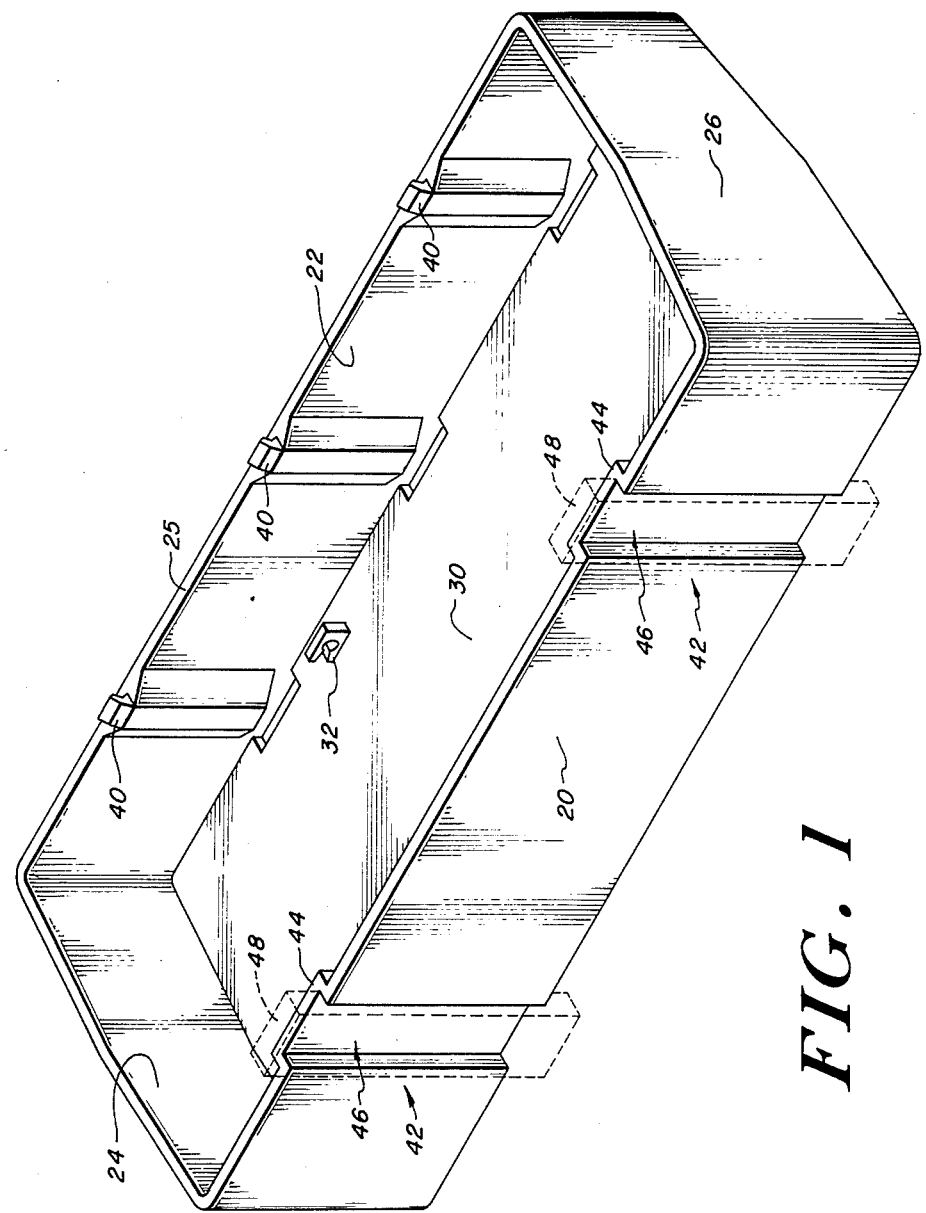
FIG. 1 is a perspective illustration of an accessory tray for a portable computer in accordance with the invention.
Figure 2:
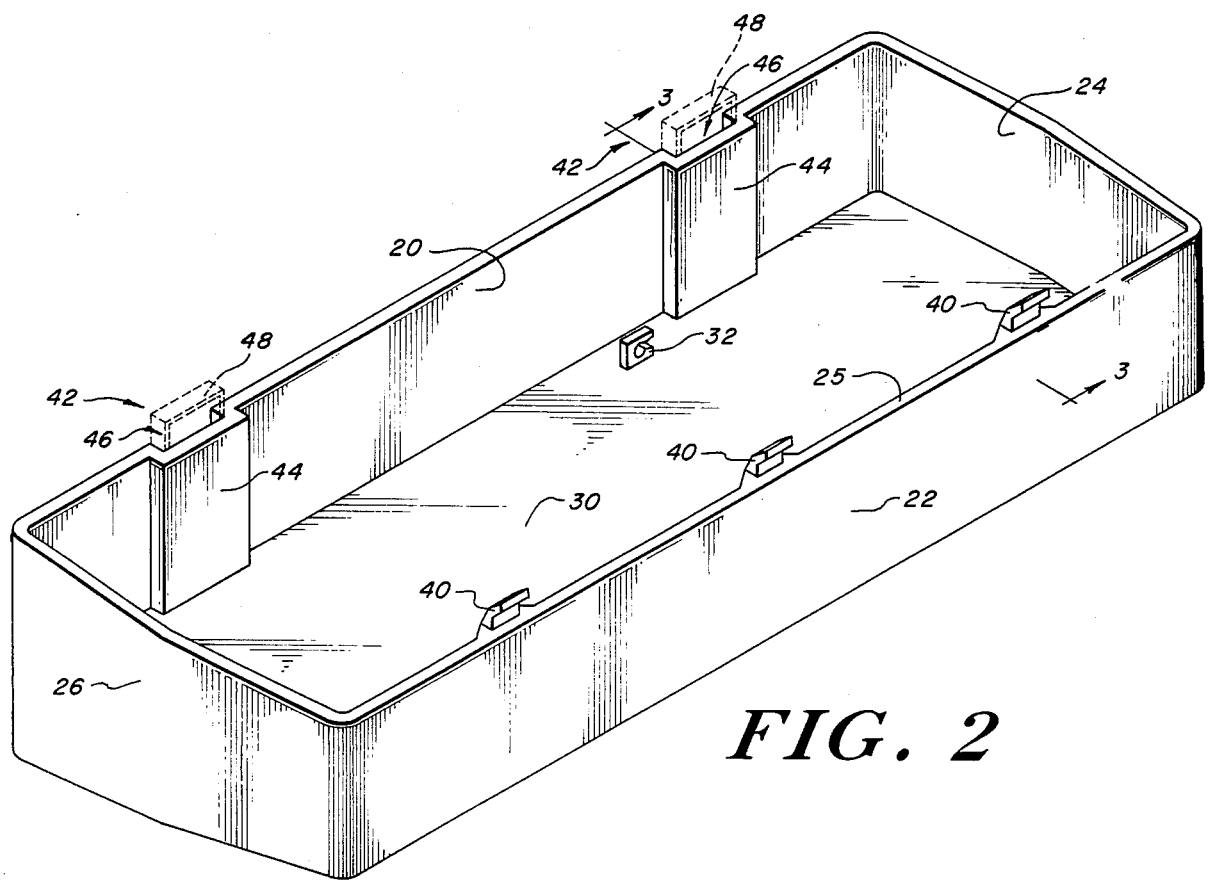
FIG. 2 is a perspective illustration of an accessory tray for a portable computer in accordance with the invention.
Figure 3:
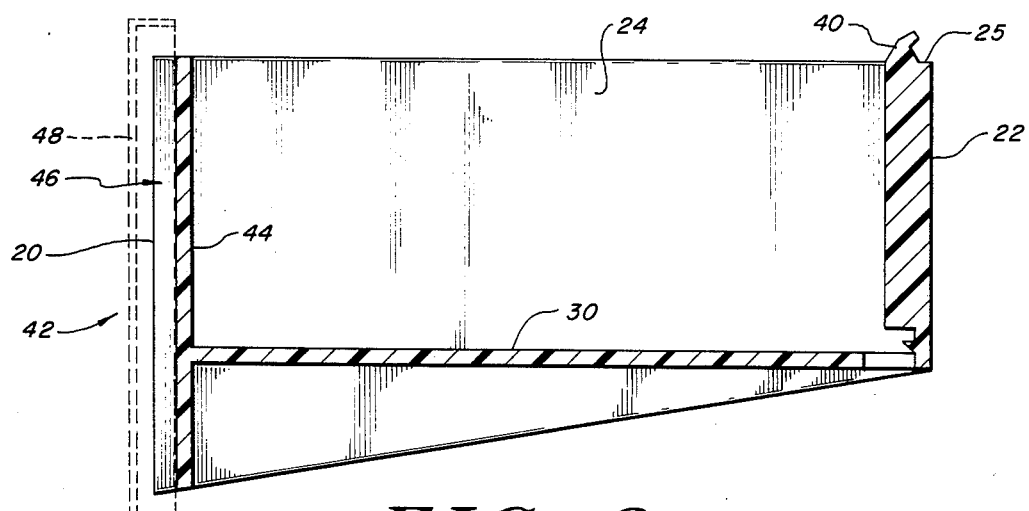
FIG. 3 is a side view of an accessory tray for a portable computer in accordance with the invention.

FIGS. 1, 2 and 3 show the preferred embodiment of the invention. As shown in FIG. 1, the invention includes a generally rectangular frame defined by a front wall 20, a back wall 22, and side walls 24, 26 which are preferably fabricated plastic.

The bottom face of the rectangular frame is defined by a bottom section 30. The bottom section 30 may contain a holder 32 for immobilizing computer discs.

The front wall 20 contains a means for clasping. The means for clasping 42 may be formed as part of the front wall 20. The means for clasping 42 comprises a recessed rectangular section 44. The recessed rectangular section 46 defines an aperture to which a clasp 48 may be attached.

Attached to the inner face of the back wall 22 are a plurality of brackets 40 by which the frame can be attached to the main portion of the computer. The brackets 40 extend upwardly from the top face 25 of the back wall 22.

As shown in FIG. 3, the height of the front wall 20 is greater than that of the back wall 22. The bottom surface of the side walls 24, 26 slopes at an angle which complements that of the shape of the keyboard.

In the preferred embodiment, the accessory tray is adapted for use with a portable computer having a keyboard which attaches to the rest of the computer by means of brackets to form a single portable unit. The accessory tray of the preferred embodiment is designed to attach to the portable computer between the main portion of the computer and the detachable keyboard. The tray has brackets adaptable to accept brackets of the main portion of the computer and the keyboard, so that, when fully assembled for carrying, the accessory tray forms a part of the carrying case of the portable computer.

In certain types of portable computers, the keyboard portion of the carrying case slopes at an angle conforming to the shape of the keyboard. Thus, when the carrying case is placed on a flat surface in its upright carrying position, the carrying case stands at an angle. It is a feature of the preferred embodiment of the present invention that the accessory tray has a side wall sloped at an angle so when the keyboard, accessory tray, and main portion of the computer are assembled for carrying, the angle of the accessory tray complements the angle of the keyboard portion. As a result, when the carrying case is placed in an upright position, the carrying case will lie at a 90 degree angle to the flat surface upon which it is placed.

The accessory tray of the present invention also includes a holder especially designed for carrying a substantial supply of computer discs. The holder fits into the accessory tray, leaving enough room in the tray to accommodate additional material such as an owner's manual.

The accessory tray is preferably formed of a molded high impact plastic of the type used for carrying cases for portable computers.

It should be understood that the foregoing description of the invention is intended merely to be a illustrative thereof and that other modifications and embodiments may be apparent to those skilled in the art without departing from its spirit.

Having thus described the invention, what I desire to claim and secure by Letters Patent is:

1. In combination, an accessory tray for and engageable with a portable computer having a separate keyboard, said accessory tray adapted for carrying with said portable computer and keyboard as a unitary structure, said combination comprising:

a generally rectangular tray having front, back, bottom and side walls wherein the height of the front wall is greater than the height of the back wall and wherein the bottom edge of the side walls defines an angular plane which is at an acute angle to the plane defined by the top of the side walls;

a portable computer having a tray-abutting surface;

a first clasping means for securing the tray to the computer with the top of the side walls contacting the tray-abutting surface;

a keyboard having a tray-abutting surface adapted to extend in the interlocked position of the structure at an angle which is complementary to the angle of the tray angular plane; and a second clasping means for securing the tray to the keyboard on the bottom of the side walls contacting the tray.

2. A combination according to claim 1 wherein the bottom wall is not perpendicular to the side walls.

3. A combination according to claim 1 wherein the side walls extend at least in part below the bottom wall.

4. A combination according to claim 1, further comprising means for holding attached to the upper face of the bottom section.

* * * * *